United States Patent
Niehwöhner

(10) Patent No.: US 6,253,439 B1
(45) Date of Patent: Jul. 3, 2001

(54) METHOD FOR FASTENING A REINFORCEMENT FRAME IN A VEHICLE ROOF OPENING

(75) Inventor: Heino Niehwöhner, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/193,029

(22) Filed: Nov. 16, 1998

Related U.S. Application Data

(63) Continuation of application No. PCT/EP97/02422, filed on May 12, 1997.

(51) Int. Cl.⁷ .................................................. B23P 11/00
(52) U.S. Cl. .............................. 29/509; 29/243.5; 72/315
(58) Field of Search ................................. 29/243.5, 509; 296/216.01, 216.07, 216.08; 72/315

(56) References Cited

U.S. PATENT DOCUMENTS

| | | | |
|---|---|---|---|
| 1,812,395 | * | 6/1931 | Eksergian ................................ 29/509 |
| 3,239,269 | * | 3/1966 | Wilfert et al. . |
| 4,333,680 | * | 6/1982 | Wolf et al. . |
| 4,601,091 | | 7/1986 | Grimm et al. . |
| 4,706,489 | | 11/1987 | Dacey, Jr. . |
| 4,827,595 | * | 5/1989 | Dacey, Jr. . |
| 4,898,016 | * | 2/1990 | Moeller et al. .................. 29/401.1 X |
| 4,928,388 | | 5/1990 | Dacey, Jr. ............................. 29/798 |
| 5,150,508 | * | 9/1992 | St. Denis ........................ 29/243.5 X |
| 5,267,387 | * | 12/1993 | Sawa ..................................... 29/509 |
| 5,740,691 | * | 4/1998 | Kovarovic .......................... 72/315 X |
| 5,795,014 | * | 8/1998 | Balgaard . |

FOREIGN PATENT DOCUMENTS

| | | | | |
|---|---|---|---|---|
| 55-42735 | * | 3/1980 | (JP) ...................................... 29/509 |
| 6-170465 | * | 6/1994 | (JP) ...................................... 29/505 |
| WO 95/21711 | * | 8/1995 | (WO) . |

* cited by examiner

Primary Examiner—P. W. Echols
Assistant Examiner—Steven A Blount
(74) Attorney, Agent, or Firm—Baker Botts L.L.P.

(57) ABSTRACT

To fasten a reinforcement frame in an opening in a vehicle roof member, the roof member is supported on a flanging bed and moved in succession against flanging edges of a plurality of flanging jaws. To insert the jaws into the roof opening, the jaws can be displaced in a plurality of moves of individual jaws parallel to the plane of the opening in which jaws are withdrawn from straight portions of the margin of the opening to permit corner jaws to be withdrawn from corner portions of the opening.

15 Claims, 4 Drawing Sheets

METHOD FOR FASTENING A REINFORCEMENT FRAME IN A VEHICLE ROOF OPENING

REFERENCE TO RELATED APPLICATION

This application is a continuation of International Application No. PCT/EP97/02422 filed May 12, 1997.

BACKGROUND OF THE INVENTION

This invention relates to methods for flanging the periphery of a roof opening for a sliding roof portion and to an arrangement for carrying out the flanging.

As used herein, the term "sliding roof" includes not only a sunroof but all variations, such as a sliding ventilator roof, a ventilator roof, a large or small folding roof, etc. By the present invention, any motor vehicle roof opening can be framed, independently of the nature of the material of the roof portion to be inserted in the opening.

The fabrication of a sliding roof in a motor vehicle is comparatively expensive since, for stability of the roof and secure guidance of the slide, an auxiliary or reinforcing frame be mounted around the roof opening to receive the sliding roof. In the manufacture of the motor vehicle the sliding roof opening is usually punched out of the roof but, during or after its production and before it is attached to the body member, a flanged edge extending inwardly in relation to the roof is formed. Then the reinforcing frame is laid over the flanged edge and is attached to the roof by applying adhesive to the inside of the roof and/or to the reinforcing frame. When the reinforcing frame is inserted into the roof opening, the flanged edge centers it in the opening. Then the roof with the reinforcing frame is placed in a folding press in which the flanged edge is folded over the adjacent edge of the reinforcing frame. A disadvantage of this arrangement is that the conventional tools and presses used for such flanging, beside being expensive, require a considerable amount of space, several presses usually being required for several folding operations including prefolding and finish folding. The mounting arrangements for the presses are also expensive, since they need special foundations and are therefore fixed in place. Because of the high cost of the folding tools, any change, for example to a different size of sliding roof opening, is very expensive and cost-intensive.

SUMMARY OF THE INVENTION

Accordingly, it is an object of the present invention to provide a method and an arrangement for fastening a reinforcement frame in a vehicle roof opening which overcomes disadvantages of the prior art.

Another object of the invention is to provide a method and an arrangement for producing a flanging or folding connection in a vehicle roof opening that is inexpensive and flexible in operation.

These and other objects of the invention are attained by placing the peripheral edge of a reinforcing frame in contact with the inner edge of a roof opening and flanging one of the edges until it has been folded over the other edge. A preferred flanging arrangement has several flanging jaws which are insertable in the roof opening and displaceable toward and away from the marginal edges of the reinforcing frame and the roof opening and which have flanging edges directed outwardly with respect to the roof opening, the jaws being disposed at least at the corners of the opening or around at least 300° of the periphery of the opening or around at least 80% of the periphery of the opening.

In the method of the invention for fixing the frame in a roof opening of the motor vehicle, it is essential that a fixture is employed instead of a press. That is, the roof member is not, as heretofore, moved into a press in which two tools are forced together to flange and fold the margin of the opening. Instead, the roof member is engaged by at least one, and preferably at least five to eight jaws that are disposed essentially only around the marginal portion to be flanged, and which have dimensions essentially corresponding only to the bending forces required for flanging. These jaws each have one or more flanging edges, preferably up to four, which successively engage and flange the margin of the roof opening or the frame. It is likewise essential to the invention that the jaw or jaws are arranged inside the roof opening when the roof member is being engaged by their flanging edges. This permits a markedly compact conformation of the fixture so that the roof member with its opening can be laid on a platform, the jaws being arranged within the platform in the region of the roof opening, allowing the roof member to be slid in place and removed simply and quickly from above, whereas in the presses hitherto employed, the roof member must be placed between and removed from between opposed pressing tools.

During the flanging operation, the roof member or sheet metal member rests on a flanging bed which is adjustable in relation to the jaws. For a positive flanging operation, hold-downs may also be provided to retain the roof member or sheet metal member against the bed, and filler slides may be provided to support the marginal region to be flanged. Preferably the filler slides are accommodated in the hold-downs.

Ordinarily the marginal region of the roof opening is flanged or folded over the marginal region of the frame, first because the frame is thereby held securely to the roof, and second because the roof material is usually several tenths of a millimeter thinner than that of the frame. Advantageously, to provide a connection of high stability, at least 80% of the marginal region is flanged.

An important step in the present invention is the displacement of the jaws horizontally to the opening, i.e. parallel to the plane of the opening, while the jaws are surrounded by the margin of the opening. This displacement of the jaws is preferably effected without any vertical component of displacement, the necessary vertical motion preferably being provided by the platform on which the roof member is retained. Horizontal displacement of the jaws can be effected by a comparatively simple arrangement, the displacement preferably taking place in several moves of individual jaws, i.e. one or more but not all of the jaws are first displaced horizontally into or out of a flanging position, and then one or more other jaws, preferably all the remaining jaws, are then displaced horizontally. This method enables the entire edge margin of the roof opening to be flanged by the jaws. Advantageously, jaws are provided for the corner portions of the roof opening and at least one, preferably four or more, jaws are provided for the substantially straight portions of the roof opening, each set of the straight jaws and the corner jaws preferably being displaced concurrently. In this way, the roof opening can be passed over the jaws onto the platform and then first the corner jaws and second the side jaws are closed onto the marginal region, so that up to 100% of the marginal region may be covered by the jaws. After the platform has been elevated against the jaws, more than once if necessary, the platform is lowered and the jaws are retracted again in the reverse order and the roof member with the flanged frame is taken out. In order to advance and retract the jaws horizontally, a rotary motion is especially suitable, i.e. rotation of a shaft or disc about its longitudinal axis, the shaft or disc having jaw engagers distributed about its periphery which are coupled to the corresponding jaws. By rotation of the shaft, the engagers are pulled and or pushed, and the corresponding jaws thereby retracted or advanced. Alternatively, the jaws may be displaced by hydraulically powered piston and cylinder units, preferably one for each jaw, which are located outside of the opening in the roof member. The jaws are preferably mounted on guides.

In a preferred embodiment, the advance of the jaws toward the margin of the roof opening is utilized to bend the marginal region in a first step, preferably by at least 45°, and desirably by 60° to 90°. That is, the jaws are moved against the marginal region so as to bend it over in a preflanging step. To support the marginal region which is not to be bent, filler slides are moved against that region as described above. After the preflanging step the flanging bed lifts and presses the preflanged marginal region against the flanging edges of the jaws. In this way the entire folding and flanging operation can be performed with one or two flanging edges per jaw.

Preferably, the marginal region being flanged according to the present invention is not in the plane of the roof but projects away from it, desirably at an angle of about 90°. This makes possible an especially favorable engagement of the marginal region with the flanging edges of the jaws. This orientation of the roof opening of the marginal region to be flanged can actually be carried out in the press in which the roof is fabricated.

A flanging fixture useful in the invention has a plurality of jaws which are horizontally displaceable, as described above, in an opening in a metal sheet member, the jaw displacement preferably being essentially in the horizontal direction only. The sheet metal member is supported on a platform or flanging bed by which it is lifted against the flanging edges of the jaws, flanging the marginal region of the opening, preferably as far as a complete fold. This flanging fixture has enough jaws with flanging edges located in a region in which the opening in the sheet metal member is placed so that at least 300° of the area of the opening, starting from the center of gravity of the open area, or at least four corners, or at least 80% of the marginal region of the opening, can be flanged. Preferably several of the foregoing conditions are met, and desirably all of them. For this purpose, the flanging fixture has at least five and preferably at least eight jaws with corresponding flanging edges, the jaws being horizontally displaceable in two or more stages, as described above. The jaws may have several, for example two to four, flanging edges located one above another, against which the edge to be flanged or folded can be brought successively. For this purpose, the sheet metal member is placed with its opening surrounding the jaws, the marginal region of the opening preferably projecting upwardly out of the plane of the sheet metal, desirably at an angle of from 45° to 90° measured from the side facing the opening or, alternatively, from the sheet metal side. First the corner jaws and then the straight edge jaws are moved toward the marginal region of the opening. Then the platform holding the sheet metal member is lifted, and a preflanging operation is carried out on the first flanging edges of the jaws, which are suitably configured. The jaws are then retracted in reverse order and the platform is moved somewhat higher, or else lower depending on the arrangement of the flanging edges of the jaws, and the jaws are shifted back to the marginal region as described. Then the platform is raised again and an additional flanging or folding of the marginal region takes place. All this may be repeated if necessary. The horizontal displacement of the jaws is preferably effected by a rotary motion, as described above, and the fixture preferably has the structure described above.

In accordance with the foregoing mode of operation of the fixture, there is another method of the invention, which is preferably carried out jointly with the method described above, and is combinable with any of the individual steps described above. This method involves the displacement in the horizontal plane of an opening in a sheet metal member of a plurality of jaws having flanging edges, followed by motion of the margin of the opening toward the flanging edges of the jaws, the marginal region of the opening being flanged over at least 300° with respect to the center of gravity of the opening and/or over at least four corner regions and/or over at least 80% of the margin region of the opening

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
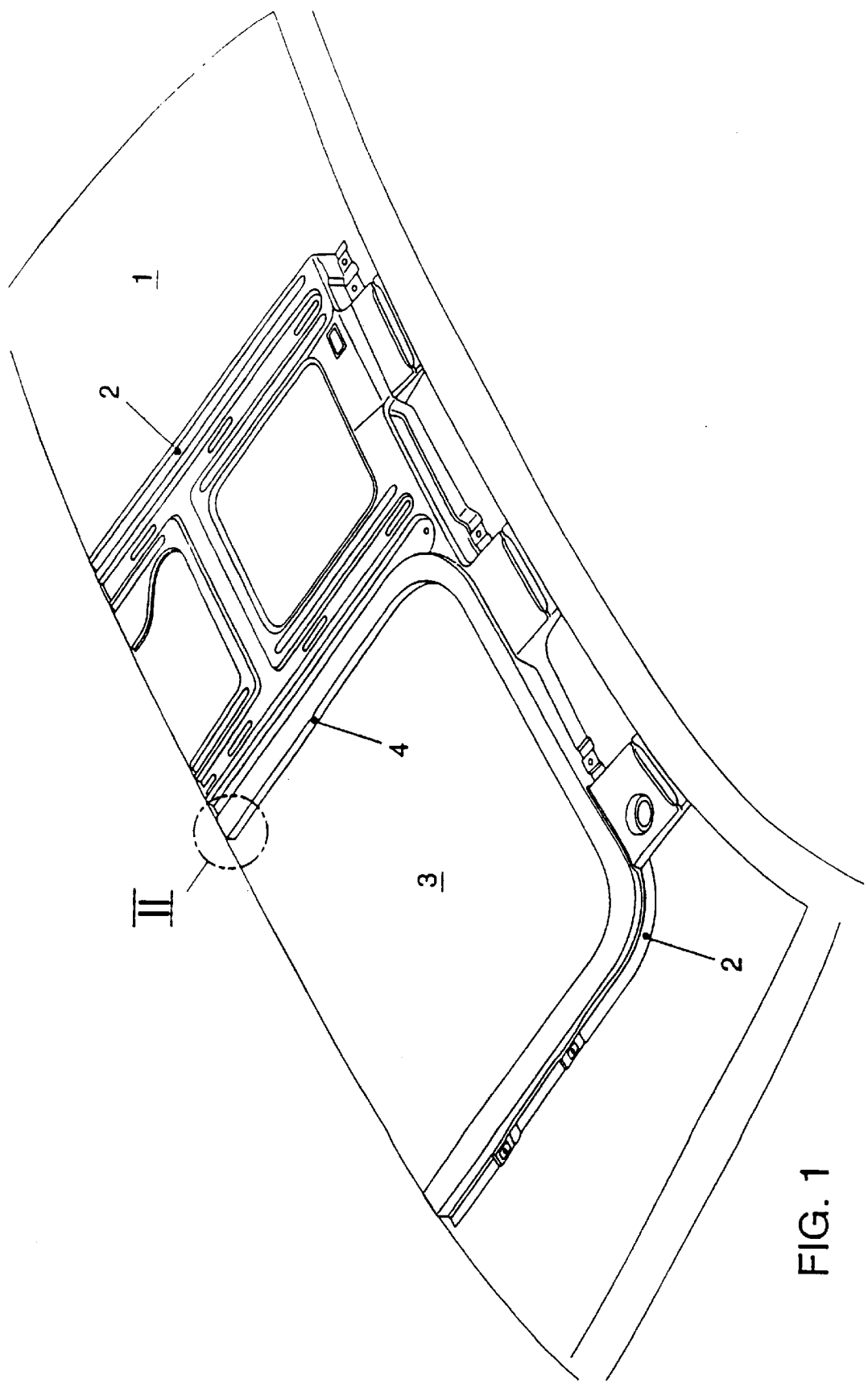
FIG. 1 is a perspective view showing a portion of a motor vehicle roof with an opening having a reinforcing frame for a sliding roof.

In the typical roof opening arrangement shown in FIG. 1, a formed sheet metal roof member 1 with a reinforcing frame 2 inserted in and encircling an opening 3 for a sliding ventilator roof panel is partially shown. The reinforcing frame 2 is connected to the roof 1 partly by bonding and partly by a folded flange 4 encircling the entire opening 3.

Figure 2:
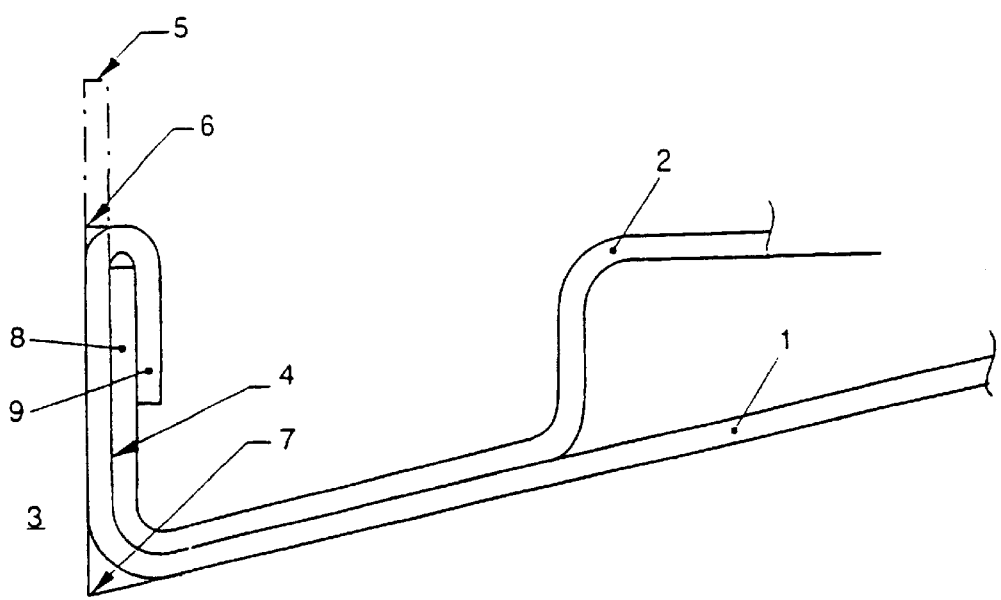
FIG. 2 is a fragmentary sectional view showing the marginal region of the opening and of the frame designated II in FIG. 1.

A portion II of the folded flange 4 is shown in more detail in section in FIG. 2. In its original state, before folding, the sheet metal roof member 1 projects a few centimeters above the flanged edge 6 in the region of the opening 3 as indicated by the dot-dash lines The flanged edge 6 projects at an angle 7 of about 85° to the plane of the roof sheet metal 1, and is inclined toward the roof member. The flanged edge 6 also serves to center the reinforcing frame 2 which is connected to the flanged edge 6 by a layer of adhesive.

Figure 3:
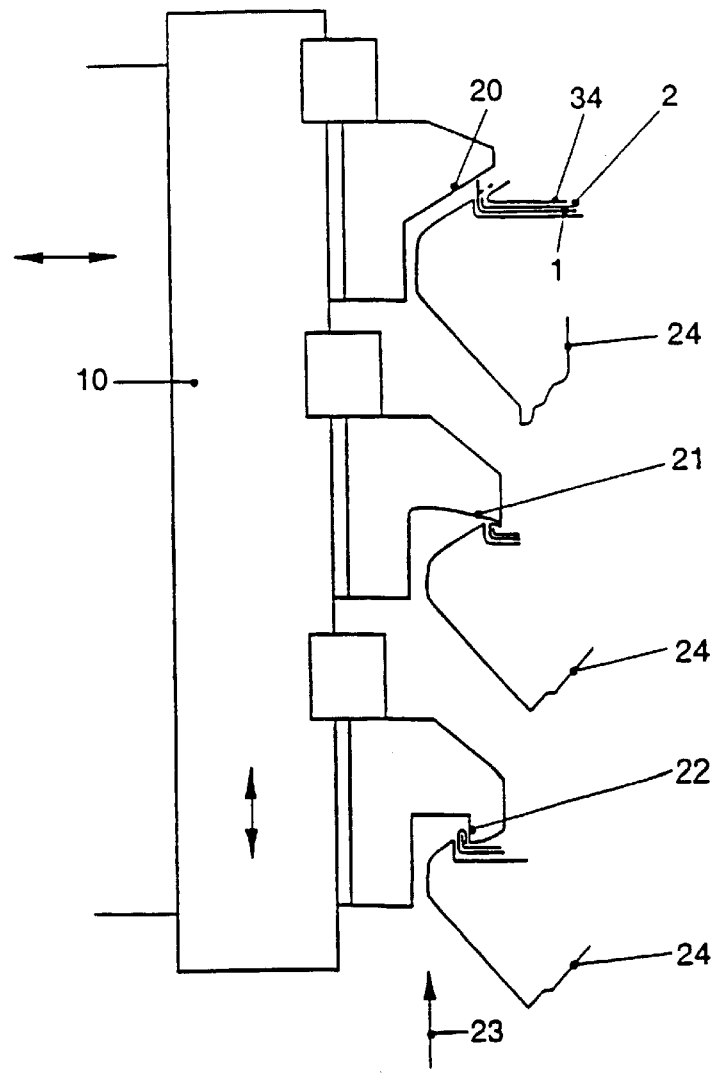
FIG. 3 is a schematic side view illustrating a jaw having three flanging edges.

After the reinforcing frame 2 has been positioned on the flanged edge 6, the portion 5 which extends beyond the flanged edge 6 is folded over the marginal region 8 of the reinforcing frame 2 to its final flange position 9 by a folding fixture in several steps. This folding takes place in three steps at three flanging edges 20 to 22 of each jaw, as indicated in FIG. 3. For a clean flanging operation, a filler slide 34 is held against the marginal region 8 of the reinforcing frame. The first flanging edge 20 provides a preflanging fold of the projecting edge 5 of the roof, the second flanging edge 21 provides a further preflanging, and the flanging edge 22 provides the final flanging as the sheet metal member is moved successively against the flanging edges 20 to 22 by a flanging or folding bed 24 as indicated by the arrow 23. Between these flanging operations, the jaw 10 is advanced and retracted a shown by the horizontal double-headed arrow.

Figure 4:
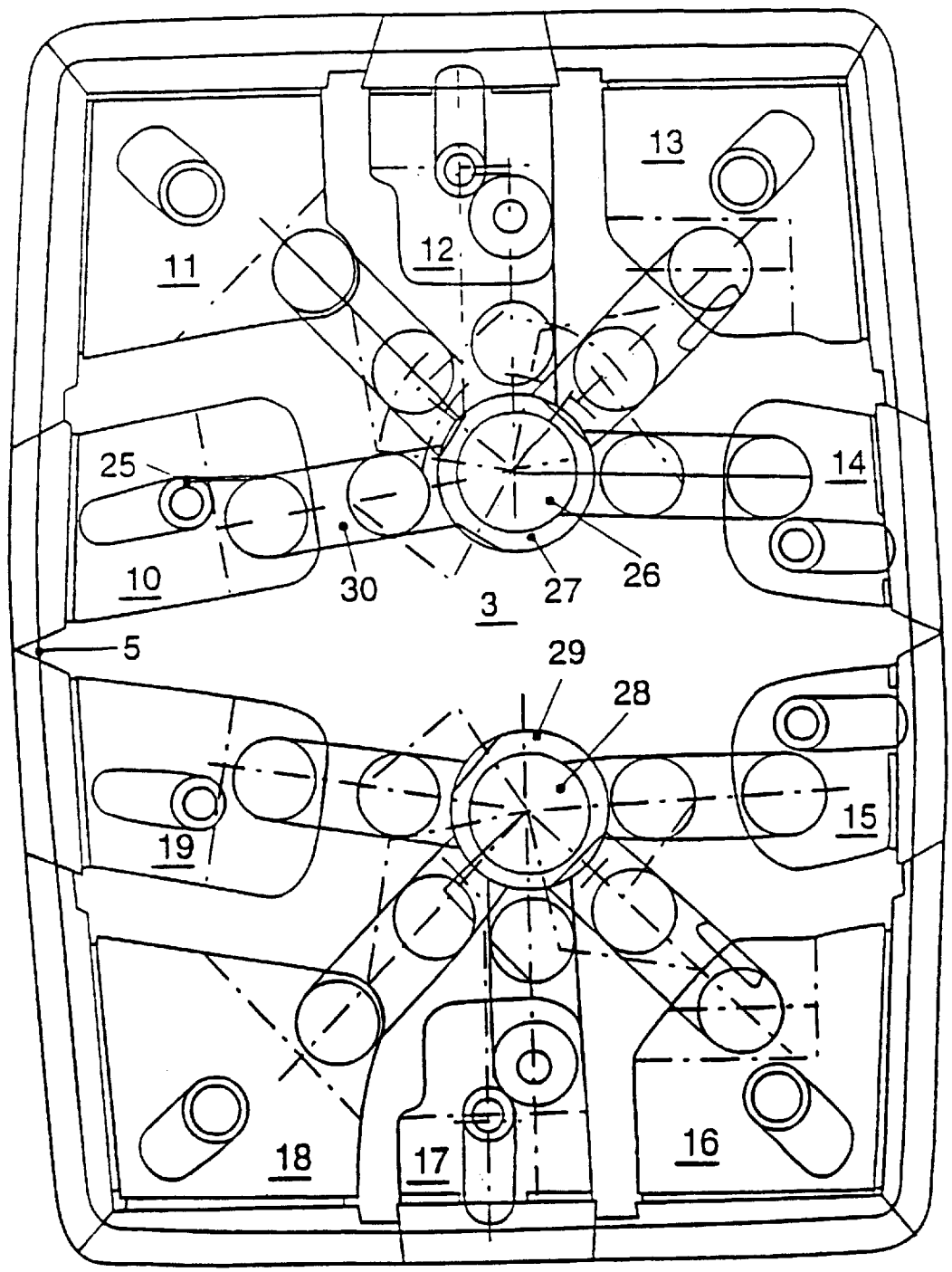
FIG. 4 is a plan view illustrating the arrangement of a plurality of jaws in a roof opening.

FIG. 4 is a plan view showing the arrangement of the jaws 10–19 in the roof opening 3. The jaws 10–19, arranged as slides guided by pin guides 25, are displaced by a total of four rotary drives 26–29, the drives 26 and 27 and 28 and 29, respectively, being arranged concentrically. The jaws 10, 12 and 14 are connected to the rotary drive 26 by engagers 30, and the jaws 11 and 13 are similarly connected to the rotary drive 27 while the jaws 15, 17 and 19 are connected to the rotary drive 28 and the jaws 16 and 18 are connected to the drive 29. After flanging by one of the jaw edges 20, 21 and 22, the jaws 10, 12 and 14 are retracted from the positions shown in FIG. 4 by rotation of the rotary drive 26, so that the jaws 11 and 13 are exposed at the sides and can then likewise be retracted by rotation of the rotary drive 27 and the jaws 15–19 are similarly retracted. This releases the marginal region 6 of the opening 3 so that the roof member may either be moved to one of the other flanging edges or removed from the fixture.

Figure 5A:
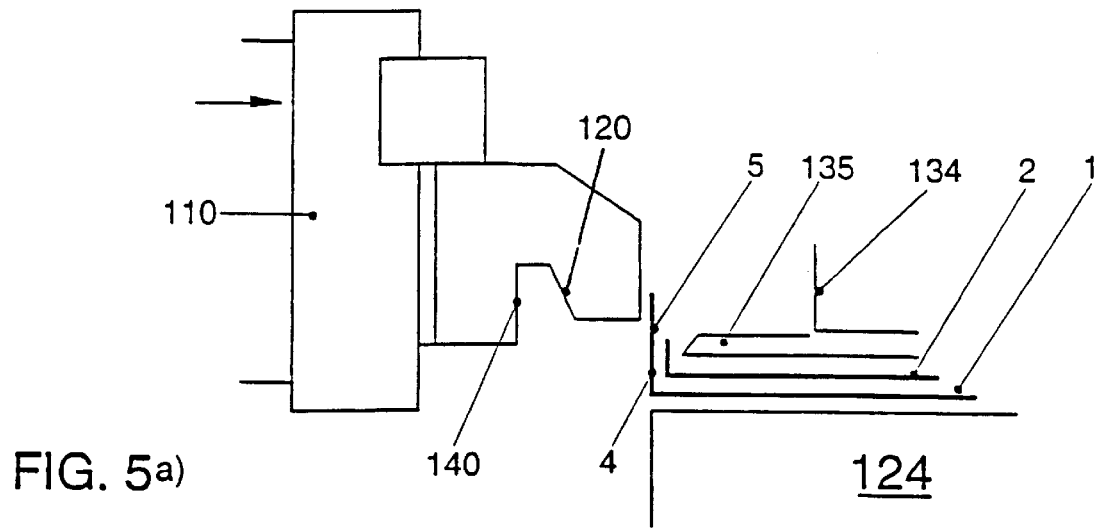
FIGS. 5a and 5b are schematic side views showing the positions of a jaw with flanging edge.
Figure 5B:
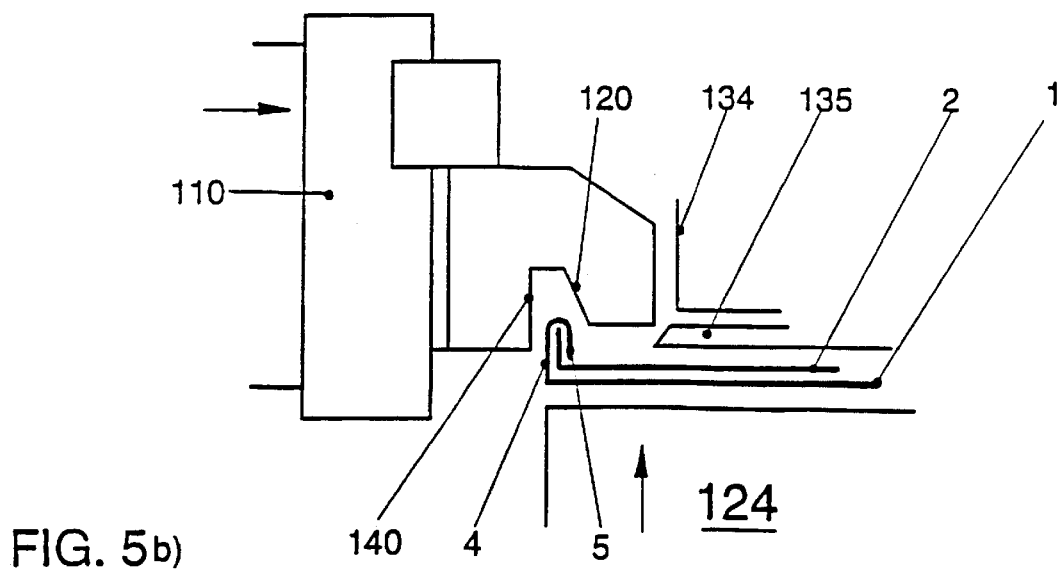

FIGS. 5a and 5b show a flanging operation for which only a single flanging edge 120 is required. In this method, the flanging edge 120 of the jaw 110 is first moved against the edge region 5 of sheet metal member 1 which is to be flanged and which rests on a folding or flanging bed 124. Above the sheet metal member 1 the auxiliary frame 2 is pressed toward the flanging bed 124 by a hold-down 134. From the hold-down 134, a filler slide 135 is extended, abutting on the lower part 4 of the marginal region to be flanged. By displacement of the jaw 110 in the direction of the arrow, the upper portion 5 of the marginal region to be flanged is folded at an angle of about 90° toward the filler slide 135, moving a gap 140 in the flanging edge 120 over the marginal region 4. At the same time, the filler slide 135 is withdrawn into the hold-down 134. Then the flanging bed 124 moves up, as shown by the arrow in FIG. 5b, causing the upper marginal region 5 to be folded over and flanged to the auxiliary frame 2. Alternatively, the marginal region 4 may be backed up by a separately movable part of the flanging bed 124.

Compared to the folding presses heretofore used, the folding fixture according to the invention has the advantage of a substantially smaller space requirement, since a fixture of the type described permits operation in several stages. At the same time, the folding fixture or method does not require a separate foundation, as is usual for folding presses. Consequently, the folding fixture is not fixed in location but can be moved. As a result lower production costs are possible overall.

Although the invention has been described herein with reference to specific embodiments, many modifications and variations therein will readily occur to those skilled in the art. Accordingly, all such variations and modifications are included within the intended scope of the invention.

I claim:

1. A method of attaching a frame to a roof opening of a motor vehicle comprising:

placing a marginal region of a frame in contact with a marginal region of an opening in a roof member, both marginal regions extending at an angle of about 90° to the plane of the opening in the roof member; and flanging the marginal regions to connect them by engagement with a flanging edge of a jaw located in the roof opening until one of the marginal regions has been flanged over the other to provide a frame for the roof opening having three adjacent marginal regions extending at an angle of about 90° to the plane of the opening in the roof member.

2. A method according to claim 1 wherein the marginal region of the opening in the roof member is flanged over the marginal region of the frame.

3. A method according to claim 1 wherein the flanging is performed repeatedly.

4. A method according to claim 1 wherein the marginal region of the roof member engages flanging edges of a plurality of jaws simultaneously.

5. A method according to claim 4 wherein the marginal region of the roof member engages flanging edges of at least five jaws.

6. A method according to claim 5 wherein the marginal region of the roof member engages flanging edges of at least eight jaws.

7. A method according to claim 1 wherein the flanging is effected in a region which encircles at least 80% of the opening in the roof member.

8. A method according to claim 4 wherein each of the jaws is displaced horizontally within the opening in the roof member into and out of flanging position.

9. A method according to claim 8 wherein the plurality of jaws is displaced in at least two stages of different sets of jaws.

10. A method according to claim 9 wherein the plurality of jaws comprises corner jaws for corner portions of the marginal region of the opening and at least one straight jaw for a straight portion of the marginal region of the opening and wherein, during horizontal displacement of the jaws, at least one jaw for a straight portion is displaced toward the marginal region after the corner jaws are displaced toward the marginal region and away from the marginal region before the corner jaws are displaced away from the marginal region.

11. A method according to claim 8 wherein the jaws of the plurality are displaced in the opening by at least one of a rotary motion of a rotatable member or hydraulic operation of a piston and cylinder unit.

12. A method according to claim 8 wherein the jaws engage and preflange the marginal region to be flanged upon displacement into their flanging position.

13. A method according to claim 1 wherein the marginal region being flanged projects from the roof member at an angle of at least 45° with respect to the plane of the roof member.

14. A method according to claim 1 wherein the marginal region of the opening in the roof member is lifted against the flanging edge.

15. A method according to claim 1 wherein the marginal region is flanged in at least two steps.

* * * * *